Patented Nov. 29, 1932

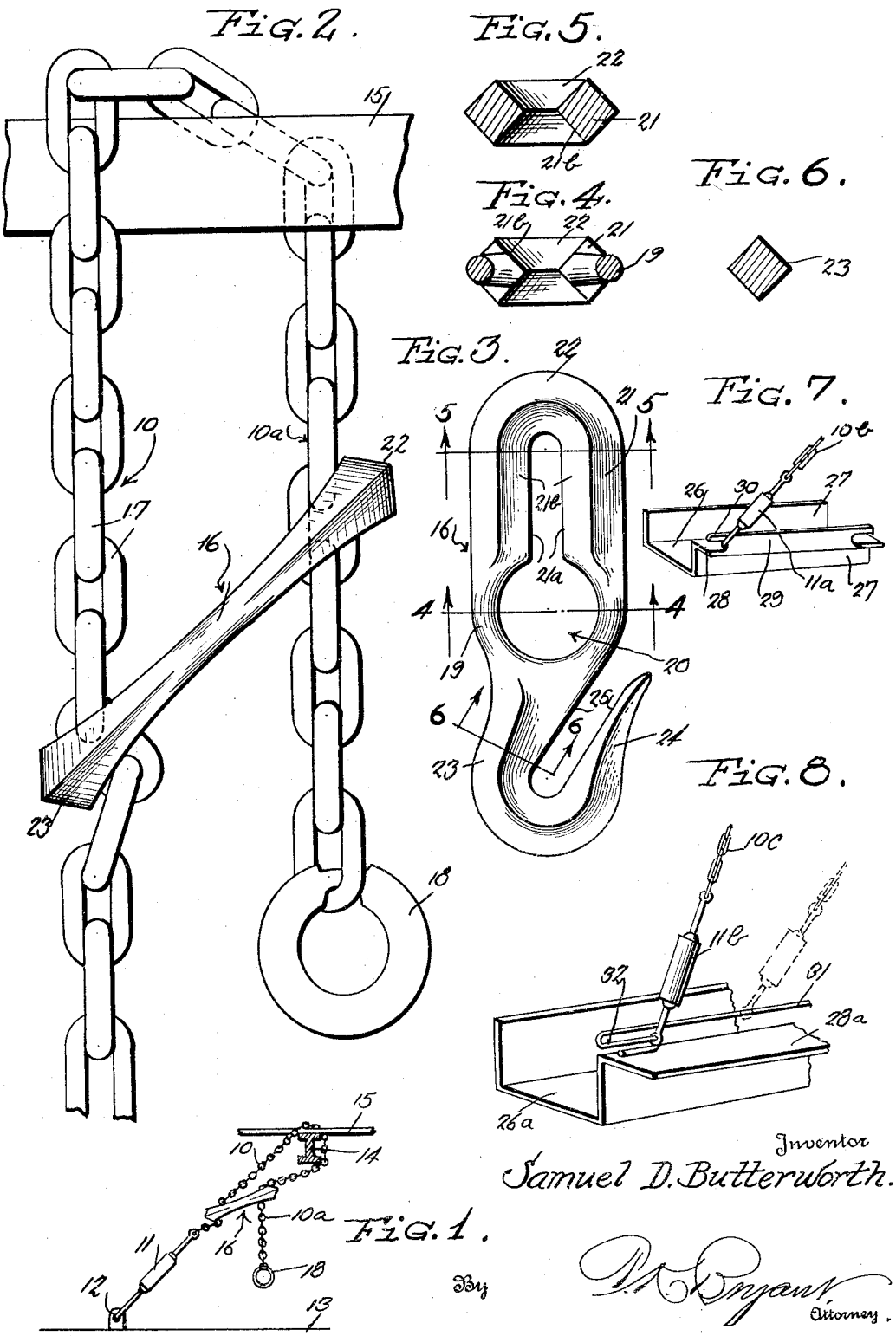

1,889,633

UNITED STATES PATENT OFFICE

SAMUEL D. BUTTERWORTH, OF DETROIT, MICHIGAN, ASSIGNOR, BY DIRECT AND MESNE ASSIGNMENTS, TO EVANS PRODUCTS COMPANY, OF DETROIT, MICHIGAN, A CORPORATION OF DELAWARE

AUTOMOBILE TIE-DOWN

Application filed April 12, 1932. Serial No. 604,821.

This invention relates to certain new and useful improvements in automobile tie-downs.

The primary object of the invention is to provide a tie-down for automobiles during shipment thereof in freight cars and the like and in anchor devices of such a character, especially where like chains are employed as tie-downs, it has been found in actual practice that when link chains are looped or wrapped around automobile axles or other parts of the automobile, the chains become loose as the result of vibration incident to travel, resulting in damage to the automobile, the present invention embodying a hook-member adjustably engageable with opposite sides or runs of a link chain to restrain the chain from movement and also being easily adjustable with respect to the chain runs in the event of any appearance of looseness in the chain.

A further object of the invention is to provide an automobile tie-down of the foregoing character wherein the hook member is permanently carried by the tie-down chain but easily movable thereover so that each tie-down chain carries its anchor hook for the anchoring of the chain in adjusted positions.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a diagrammatic view showing an automobile tie-down comprising a floor anchor chain looped about the axle and spring of an automobile with the hook device holding the tie-down chain in adjusted position;

Figure 2 is an enlarged elevational view of the tie-down chain engaged with a part of the automobile with the hook device engaged with the side runs of the chain;

Figure 3 is a side elevational view of the hook device showing the key slot for the passage and retention of the chain links in one end and the hook bill at the other end of the hook device;

Figure 4 is a cross-sectional view taken on line 4—4 of Figure 3, showing the central ring portion of the body of the hook member;

Figure 5 is a cross-sectional view taken on line 5—5 of Figure 3, showing the tapered walls of the slotted ends of the hook member;

Figure 6 is a cross-sectional view taken on line 6—6 of Figure 3, showing the rectangular cross-section of the shank portion of the hook member;

Figure 7 is a perspective view of a corner pan member of a decking frame with the tie-down chain engaged with a hook portion on the wheel supporting pan; and Figure 8 is a fragmentary perspective view of another form of wheel supporting frame for a decking frame with the tie-down chain used as an anchor device.

As diagrammatically illustrated in Figure 1, the tie-down chain 10 has a turn buckle and spring combination 11 secured to one end thereof which in turn is anchored as at 12 to the floor 13 of a shipping car or the like, the tie-down chain 10 being looped around the axle 14 and spring 15 of an automobile with the side run 10a of the chain 10 passed through an eye of a hook member 16 that has its other end detachably engaged with the tie-down chain 10 for restraining the looped portion of the tie-down chain above the hook member from movement.

The tie-down chain 10 as shown in Figure 2 is comprised of links 17, one end of the chain as shown in Figure 1, being connected to the turn buckle and spring combination 11 while the other end of the chain comprising the run 10a carries a relatively large ring 18 to prevent escape of the slotted end of the hook member 16 from the chain.

The hook member 16 as illustrated in Figures 3 to 7 in detail, includes a central body portion of substantially ring formation as shown at 19, cylindrical in cross-section as shown in Figure 4, forming a circular opening 20. The hook member 16 at one side of the central body portion 19 forms a closed loop defined by side legs 21 and a curved outer end 22 which is rectangular in cross-section as illustrated in Figure 5, with angle edges 21a of the side legs 21 disposed adjacent each other as illustrated in Figures 4 and 5 to provide tapering side walls 21b at the inner sides of the legs 21. An angularly disposed shank 23 projects out of the side of the central body portion 19 of the hook member 16, being rectangular in cross-section as illustrated in Figure 6 and carrying at its outer end a reversely directed hook bill 24 with the adjacent edges 25 of the shank 23 and bill 24 parallel to provide an open ended slot as illustrated.

The hook member 16 has the chain 10 passed through the opening 20 in the body portion 19 thereof and by moving one of the links of the chain between the parallel edges 21a of the leg member 21 at the looped end of the hook member, the adjacent link of the chain that extends transversely of the hook member is presented for engagement with the inclined faces 21b to prevent movement of the chain through the hook member. The loop end of the hook member is engaged with the run 10a of the link chain, the latter passing over the spring 15 of the automobile as illustrated in Figures 1 and 2, while the bill 24 carried by the shank 23 is engaged with the main run of the link chain and having one of the links passed between the adjacent parallel edges 25 of the shank 23 and bill 24, the adjacent links of the chain extending transversely to the hook member and prevented from movement relative thereto. It will therefore be observed from an inspection of Figures 1 and 2, that the hook member 16 is permanently carried by the tie-down chain but is freely adjustable over adjacent runs of the chain and operates to hold the chain against movement when engaged with the spring 15 of an automobile to function as a tie-down device therefor.

In the form of invention illustrated in Figure 7, the chain and its hook member is associated with a corner wheel supporting pan of a decking frame for anchoring an automobile in the decking frame. The corner wheel supporting pan is of channel formation, comprising a base plate 26 carrying upstanding side edge flanges 27, one flange 27 carrying an outwardly directed rib 28 that is flanged upwardly as at 29 with a notch in each end of the flange 29 to provide a hook 30 to be engaged by the turn buckle and spring combination 11a of the tie-down chain 10b, the chain being engaged with the axle or spring of the automobile and locked in position by a hook member as illustrated in Figures 1 and 2.

In the form of the invention illustrated in Figure 8, the tie-down chain is associated with the channel corner pan 26a of a decking frame that has an outwardly directed flange 28a at one side edge carrying a guide rod 31 looped at one end to provide a hook 32 engageable by the turn buckle and spring combination 11b of the tie-down chain 10c that is engaged with a part of an automobile as described in connection with Figure 7.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. A hook-member for tie-down chains comprising a central body portion having a circular opening therein, a loop extension at one side of the body portion with a narrow slot communicating with the circular opening and a hook bill at the other side of the body portion having a narrow entrance slot.

2. A hook-member for tie-down chains comprising a central body portion having a circular opening therein, a loop extension at one side of the body portion with a narrow slot communicating with the circular opening and a hook bill at the other side of the body portion having a narrow entrance slot, in combination with a tie-down chain wherein the looped end of the hook member is slidably and lockingly engaged with one run of the chain and the bill is lockingly engaged with the other run of the chain.

3. A hook-member for tie-down chains comprising a central body portion having a circular opening therein, a loop extension at one side of the body portion with a narrow slot communicating with the circular opening and a hook bill at the other side of the body portion having a narrow entrance slot, the hook bill being substantially within the side limits of the hook member with the entrance slot disposed at an angle to the longitudinal axis of the hook member.

In testimony whereof I affix my signature.

SAMUEL D. BUTTERWORTH.